US012689052B2

(12) United States Patent
Ichinoe et al.

(10) Patent No.: US 12,689,052 B2
(45) Date of Patent: Jul. 21, 2026

(54) FUEL CELL STACK AND FUEL GAS RELEASE METHOD

(71) Applicant: HONDA MOTOR CO., LTD., Tokyo (JP)

(72) Inventors: Yuki Ichinoe, Wako (JP); Hideharu Naito, Wako (JP); Takashi Takura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 671 days.

(21) Appl. No.: 18/113,371

(22) Filed: Feb. 23, 2023

(65) Prior Publication Data

US 2023/0290984 A1     Sep. 14, 2023

(30) Foreign Application Priority Data

Mar. 11, 2022     (JP) ................................. 2022-037656

(51) Int. Cl.
| | |
|---|---|
| *H01M 8/2475* | (2016.01) |
| *H01M 8/0273* | (2016.01) |
| *H01M 8/04082* | (2016.01) |
| *H01M 8/0662* | (2016.01) |
| *H01M 8/2483* | (2016.01) |

(52) U.S. Cl.
CPC ....... *H01M 8/2475* (2013.01); *H01M 8/0273* (2013.01); *H01M 8/04201* (2013.01); *H01M 8/0687* (2013.01); *H01M 8/2483* (2016.02)

(58) Field of Classification Search
CPC ............. H01M 8/2475; H01M 8/0273; H01M 8/04201; H01M 8/0687; H01M 8/2483; H01M 8/04; H01M 8/04014; H01M 8/04089; H01M 8/0662; H01M 2250/20; Y02E 60/50
See application file for complete search history.

(56) References Cited

U.S. PATENT DOCUMENTS

| | | |
|---|---|---|
| 2013/0333965 A1 | 12/2013 | Kobayashi et al. |
| 2016/0190632 A1* | 6/2016 | Itoga .................... H01M 8/248 |
| | | 429/467 |
| 2016/0226084 A1 | 8/2016 | Itoga |
| 2017/0222250 A1 | 8/2017 | Naito |
| 2022/0271321 A1 | 8/2022 | Naito et al. |

(Continued)

FOREIGN PATENT DOCUMENTS

| | | |
|---|---|---|
| CN | 105742543 A | 7/2016 |
| CN | 107026278 A | 8/2017 |
| JP | 2003-229150 A | 8/2003 |

(Continued)

OTHER PUBLICATIONS

Office Action dated Dec. 12, 2023 issued in the corresponding Japanese Patent Application 2022-037656 with the English machine translation thereof.

(Continued)

*Primary Examiner* — Eugenia Wang
(74) *Attorney, Agent, or Firm* — Carrier, Shende & Associates P.C.; Joseph P. Carrier; Fulchand P. Shende

(57) ABSTRACT

One side of a casing of a fuel cell stack is provided with an opening, a filter permeable to a fuel gas, and a cover covering the filter. The cover includes a first vent connecting the inside and the outside of the cover, and a second vent provided below the first vent and connecting the inside and the outside of the cover.

7 Claims, 6 Drawing Sheets

(56)                     References Cited

U.S. PATENT DOCUMENTS

| | | |
|---|---|---|
| 2022/0271322 A1 | 8/2022 | Naito et al. |
| 2023/0032827 A1 | 2/2023 | Schilling |

FOREIGN PATENT DOCUMENTS

| | | |
|---|---|---|
| JP | 2014-000833 A | 1/2014 |
| JP | 2015-076152 A | 4/2015 |
| JP | 2017-168276 A | 9/2017 |
| JP | 2022-126924 A | 8/2022 |
| JP | 2022-128982 A | 9/2022 |

OTHER PUBLICATIONS

Office Action and Search Report dated Apr. 10, 2026 issued in the corresponding Chinese Patent Application No. 202310199288.9 with the English machine translation thereof.

* cited by examiner

<u>10</u>

UP

REAR ←→ FRONT

DOWN

TRAVELING WIND

UP

DOWN

REAR ◄──► FRONT

FUEL CELL STACK AND FUEL GAS RELEASE METHOD

CROSS-REFERENCE TO RELATED APPLICATIONS

This application is based upon and claims the benefit of priority from Japanese Patent Application No. 2022-037656 filed on Mar. 11, 2022, the contents of which are incorporated herein by reference.

BACKGROUND OF THE INVENTION

Field of the Invention

The present invention relates to a fuel cell stack and a fuel gas release method.

Description of the Related Art

In recent years, research and development have been conducted on fuel cells that contribute to energy efficiency in order to ensure that more people have access to affordable, reliable, sustainable and modern energy. A fuel cell stack is formed by stacking a plurality of fuel cells.

When a fuel cell stack is mounted on a vehicle, the fuel cell stack is housed in a casing as described in, for example, JP 2015-076152 A. Because it is assumed that a small amount of fuel gas (hydrogen gas) leaks from the fuel cell stack, it has been proposed to provide a ventilation structure to the casing. For example, in the casing described in JP 2015-076152 A, a cover (ventilation cover) is provided on a wall surface of a stack casing in order to protect a filter.

SUMMARY OF THE INVENTION

In order to suitably protect the filter disposed inside the cover, it is effective to make the area of a vent, which is an opening provided in the cover, as small as possible and cover the entire surface of the filter by the cover. However, when the concentration of the fuel gas increases inside the cover, a significant difference in the concentration of the fuel gas cannot be made between the inside and the outside of the filter, and the diffusion and ventilation efficiency of the ventilation structure decreases.

An object of the present invention is to solve the above-described problem.

According to a first aspect of the present invention, there is provided a fuel cell stack including: a cell stack body including a plurality of power generation cells; and a casing housing at least one of the cell stack body and a fuel cell auxiliary device, wherein the casing includes a side provided with an opening; a filter attached to the opening and permeable to a fuel gas; and a cover attached outside the filter, and the cover includes a first vent configured to connect an inside and an outside of the cover and a second vent provided at a position lower than the first vent and configured to connect the inside and the outside of the cover.

According to a second aspect of the present invention, there is provided a fuel gas release method for a fuel cell stack including: a cell stack body including a plurality of power generation cells; and a casing housing at least one of the cell stack body and a fuel cell auxiliary device, wherein the casing includes a side provided with an opening; a filter attached to the opening and permeable to a fuel gas; and a cover attached outside the filter, and the cover includes a first vent configured to connect an inside and an outside of the cover and a second vent provided at a position lower than the first vent and configured to connect the inner side and the outer side of the cover, the method comprising: releasing the fuel gas from the inside to the outside of the cover through the first vent; and taking in air from the outside to the inside of the cover through the second vent.

The fuel gas is released from the space between the filter and the cover to the outside of the casing through the first vent by buoyancy, and the outside air is taken into the space between the filter and the cover through the second vent, thereby generating natural ventilation. Since the concentration of the fuel gas in the space between the filter and the cover is diluted and a difference in concentration of the fuel gas is made between the inside and the outside of the filter, a flow of the fuel gas from the inside of the filter to the space between the filter and the cover is provided. Therefore, the diffusion and ventilation efficiency of the ventilation structure can be improved.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a front view of a cover; and

FIG. 6 is a diagram for explaining ventilation during traveling of the fuel cell vehicle.

DETAILED DESCRIPTION OF THE INVENTION

Figure 1:
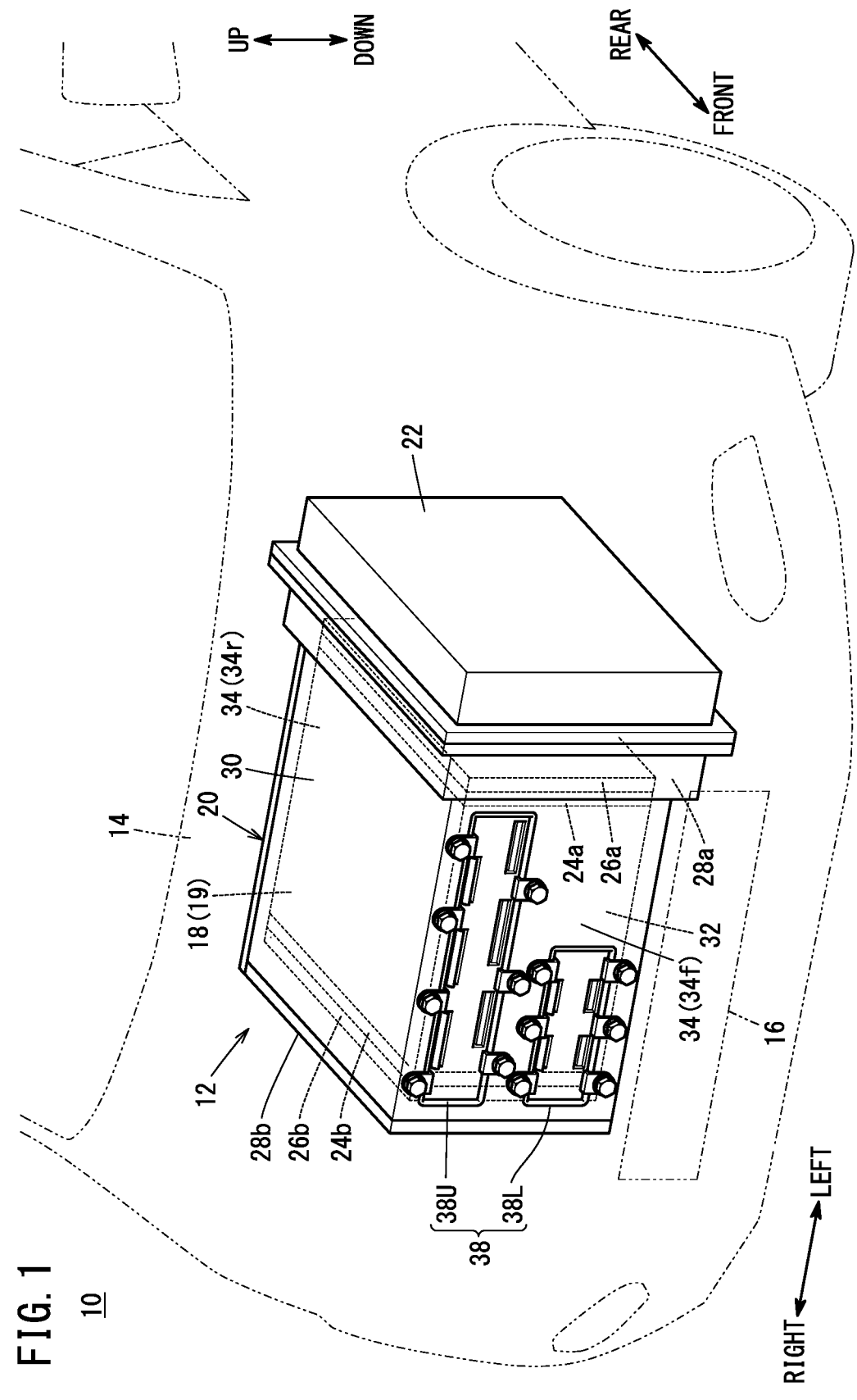
FIG. 1 is a perspective view of a fuel cell vehicle equipped with a fuel cell stack according to an embodiment of the present invention.

A fuel cell vehicle 10 shown in FIG. 1 includes a fuel cell stack 12 according to the present embodiment. A front part of the fuel cell vehicle 10 includes a front room 14. A front end portion of the fuel cell vehicle 10 includes a front grille 16. During traveling of the fuel cell vehicle 10, atmospheric air as traveling wind enters the front room 14 from the front grille 16 and the like.

The fuel cell stack 12 includes a cell stack body 18, a stack case 20 housing the cell stack body 18, and an auxiliary device case 22 housing a fuel cell auxiliary device (not shown). The auxiliary device case 22 is adjacent to the stack case 20 in the vehicle width direction and is fixed to the stack case 20. The stack case 20 and the auxiliary device case 22 are housed in the front room 14. A motor and the like (not shown) are also disposed inside the front room 14. The motor is a driving force generation source of the fuel cell vehicle 10.

The cell stack body 18 includes a plurality of power generation cells 19 stacked in the vehicle width direction. Although not shown in detail, each power generation cell includes a membrane electrode assembly (MEA) and a pair of separators sandwiching the membrane electrode assembly from both sides. The membrane electrode assembly includes an electrolyte membrane, a cathode, and an anode. The cathode and the anode are disposed on opposite sides of the electrolyte membrane. A fuel gas (for example, a hydrogen-containing gas such as a hydrogen gas) supplied to the anode and an oxygen-containing gas (for example, compressed air) supplied to the cathode cause electrochemical reactions between hydrogen and oxygen to generate electric power.

At one end of the cell stack body 18 in the stacking direction, a first terminal plate 24a, a first insulating plate 26a, and a first end plate 28a are arranged outward in this order in the fuel cell stack 12. The first end plate 28a is a part of the auxiliary device case 22, and is fixed to the left end of the stack case 20 by bolts (not shown). At the other end of the cell stack body 18 in the stacking direction, a second terminal plate 24b, a second insulating plate 26b, and a second end plate 28b are arranged outward in this order in the fuel cell stack 12. The second end plate 28b is fixed to the right end of the stack case 20 by bolts (not shown).

The stack case 20 includes an upper wall portion 30, a lower wall portion 32, and front and rear side wall portions 34 (a front wall portion 34f and a rear wall portion 34r) connecting the upper wall portion 30 and the lower wall portion 32. An opening at the left end of the stack case 20 is closed by the first end plate 28a which is a part of the auxiliary device case 22. The opening at the right end of the stack case 20 is closed by the second end plate 28b.

Figure 2:
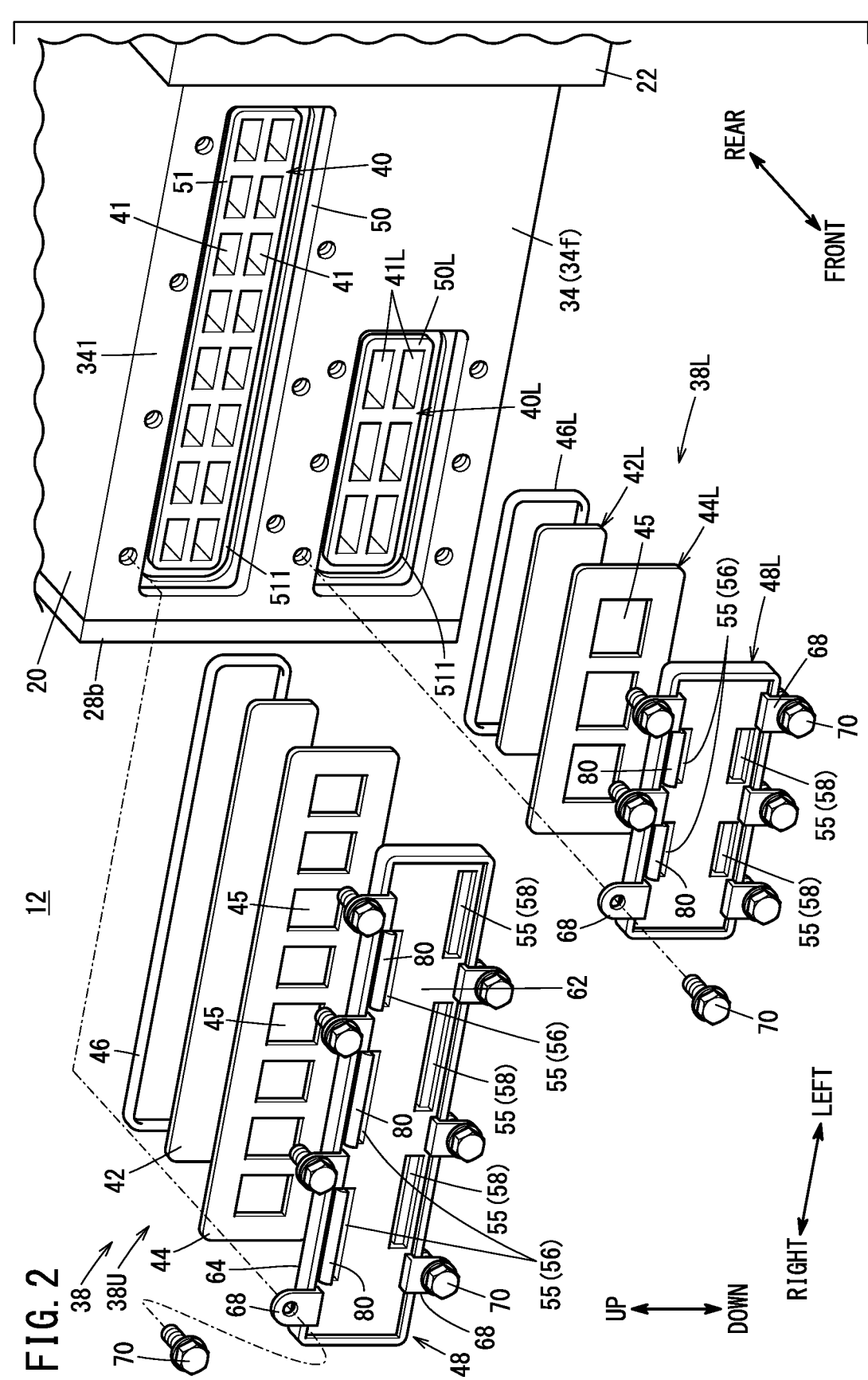
FIG. 2 is an exploded perspective view of a ventilation structure.

As shown in FIG. 2, the stack case 20 includes a side provided with openings 41, a filter 42 attached to the openings 41 and permeable to the fuel gas, and a cover 48 provided outside the filter 42. To be specific, the stack case 20 further includes a ventilation structure 38 disposed on the front wall portion 34f which is one of the side wall portions 34. The ventilation structure 38 includes an upper ventilation portion 38U disposed in an upper part of the front wall portion 34f and a lower ventilation portion 38L disposed in a lower part of the front wall portion 34f.

Figure 3:
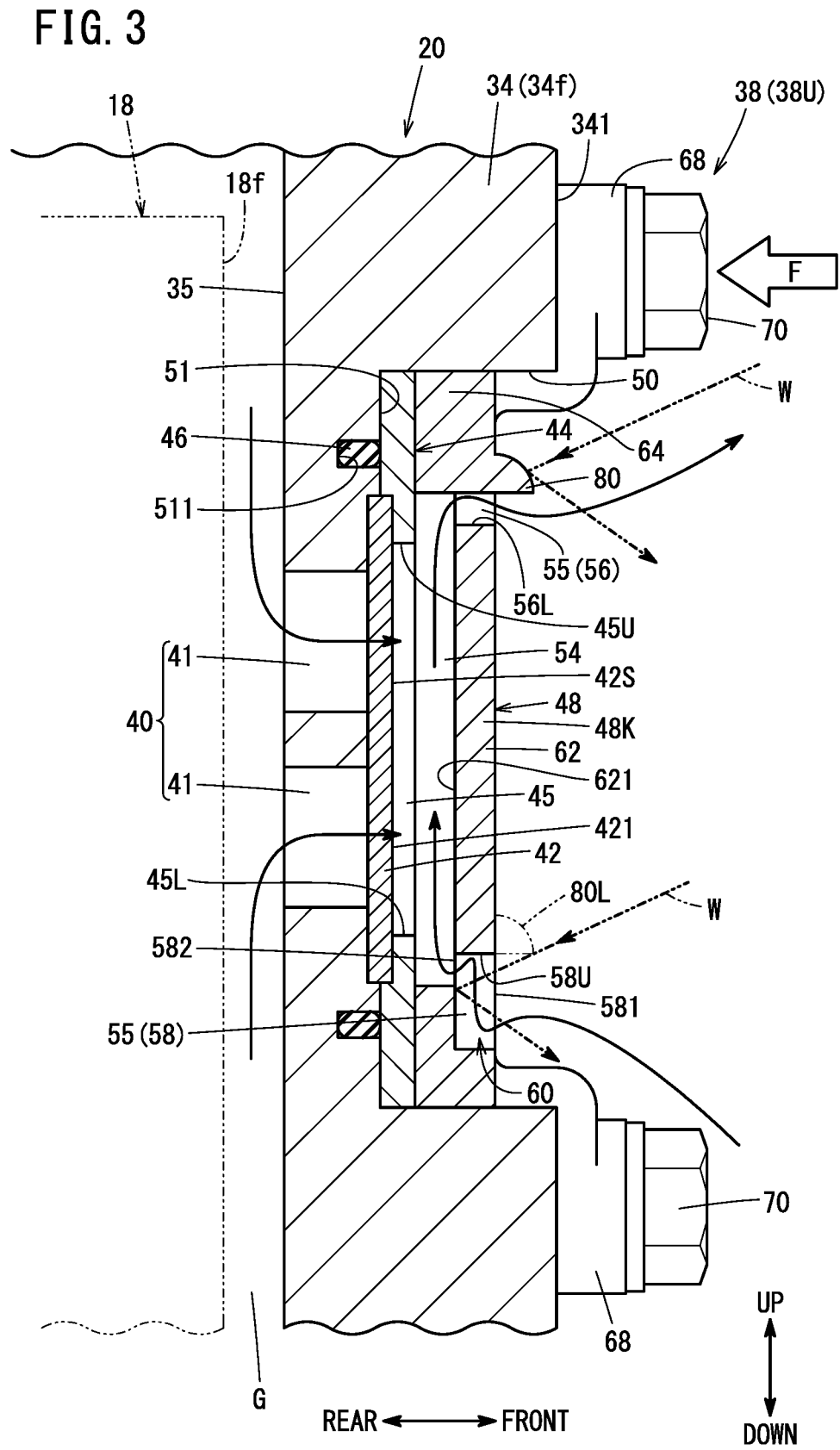
FIG. 3 is a cross-sectional view of an upper ventilation portion.

As shown in FIG. 3, the upper ventilation portion 38U has a ventilation hole structure 40 penetrating through the front wall portion 34f which is one of the side wall portions 34, and a filter 42 disposed on the outer surface of the front wall portion 34f so as to cover the hole structure 40. The upper ventilation portion 38U includes a support member 44 that supports the filter 42, a seal member 46, and a cover 48 that covers the filter 42.

A rear surface 35 of the front wall portion 34f of the stack case 20 is spaced apart from the cell stack body 18 of the fuel cell stack 12. Therefore, a gap G is formed between the front surface 18f of the cell stack body 18 and the rear surface of the front wall portion 34f. The gap G functions as a flow path for ventilation.

As shown in FIG. 2, the hole structure 40 includes a plurality of openings 41 penetrating the front wall portion 34f in the front-rear direction. In the hole structure 40, the plurality of openings 41 are arranged in the horizontal direction (vehicle width direction) and also in the vertical direction. In the present embodiment, eight openings 41 are arranged in the horizontal direction and two openings 41 are arranged in the vertical direction. The hole structure 40 includes a total of 16 openings 41.

In the hole structure 40, the plurality of openings 41 are arranged so as to extend in the horizontal direction (vehicle width direction) as a whole. An outer face 341 of the front wall portion 34f of the stack case 20 has a recess 50 extending in the horizontal direction (vehicle-width direction). The recess 50 is a groove recessed toward the inside of the stack case 20. The hole structure 40 is open at a bottom 51 of the recess 50. The number of the openings 41 is not limited to the above-described number and can be arbitrarily set.

The filter 42 is, for example, a sheet-shaped member made of polytetrafluoroethylene (PTFE). As shown in FIG. 3, the filter 42 is disposed between the hole structure 40 and the cover 48. The filter 42 is accommodated in the recess 50. The filter 42 extends in the horizontal direction (vehicle width direction) and covers all of the openings 41 of the hole structure 40.

The support member 44 supports an outer peripheral portion of the filter 42. Specifically, the outer peripheral portion of the front surface of the filter 42 is bonded to the support member 44 by adhesion or the like. The support member 44 is an intermediate member disposed between the filter 42 and the cover 48. The support member 44 extends in the horizontal direction (vehicle width direction) and is accommodated in the recess 50. The support member 44 has a plurality of openings 45 for ventilation. A front surface of the filter 42 is exposed through the plurality of openings 45. That is, the filter 42 has exposed surfaces 42S (exposed portions) which are exposed from the support member 44 which is an intermediate member, and directly face the cover 48.

A seal member 46 is disposed between the outer periphery of the support member 44 and the front wall portion 34f so as to surround the hole structure 40. The seal member 46 is made of an elastic body such as a rubber material. The bottom portion 51 of the recess 50 has an annular seal arrangement groove 511 surrounding the hole structure 40. The seal member 46 is accommodated in the seal arrangement groove 511. When the outer peripheral portion of the cover 48 presses the support member 44, the seal member 46 is compressed in the thickness-wise direction of the front wall portion 34f between the support member 44 and the front wall portion 34f.

A ventilation passage 54 is formed between the filter 42 and the cover 48. The filter 42 is exposed to the ventilation passage 54 through the openings 45 of the support member 44. The cover 48 has vents 55 that allow the ventilation passage 54 to communicate with the outside of the stack case 20. Specifically, the cover 48 includes a first vent 56 that allows the ventilation passage 54 to communicate with the outside of the stack case 20, and a second vent 58 that allows the ventilation passage 54 to communicate with the outside of the stack case 20. The second vent 58 is provided at a position lower than the first vent 56.

As shown in FIG. 2, the cover 48 includes a plurality of (three in the present embodiment) first vents 56 and a plurality of (three in the present embodiment) second vents 58. The plurality of first vents 56 are formed at intervals in the horizontal direction (vehicle width direction). The plurality of second vents 58 are formed at intervals in the horizontal direction (vehicle width direction). Each of the first vent 56 and the second vent 58 is formed in a slit shape extending in the horizontal direction (vehicle width direction).

As shown in FIG. 3, the first vent 56 is provided at a position facing the upper portion of the support member 44 in the horizontal direction (front-rear direction). In other words, the first vent 56 is provided at a position facing an upper portion of the ventilation passage 54. Therefore, the first vent 56 allows the upper portion of the ventilation passage 54 to communicate with the outside of the stack case 20. A lower end surface 56L of the first vent 56 is positioned above an upper end surface 45U of the opening 45 of the support member 44. In a direction perpendicular to a surface 421 of the filter 42 (in a front view of the filter 42), the support member 44, which is the intermediate member, is positioned on an extension line of the first vent 56, and the exposed surface 42S of the filter 42 is out of alignment with the extension line of the first vent 56.

The second vent 58 is provided at a position facing the lower portion of the support member 44 in the horizontal direction (front-rear direction). In other words, the second vent 58 is provided at a position facing a lower portion of the ventilation passage 54. Therefore, the second vent 58 allows the lower portion of the ventilation passage 54 to communicate with the outside of the stack case 20. An upper end surface 58U of the second vent 58 is positioned below a lower end surface 45L of the opening 45 of the support member 44. In the direction perpendicular to the surface 421 of the filter 42, the support member 44, which is the intermediate member, is positioned on an extension line of the second vent 58, and the exposed surface 42S of the filter 42 is out of alignment with the extension line of the second vent 58. The height dimension of a rear opening 582 of the second vent 58 is smaller than the height dimension of a front opening 581 of the second vent 58. The rear opening 582 is present only on the upper part of the second vent 58. The second vent 58 and the lower portion of the ventilation passage 54 constitute a labyrinth flow path 60 bent in a crank shape.

No other vent is formed in the cover 48 between the first vent 56 and the second vent 58 in the vertical direction. The cover 48 has an overlapping portion 48K arranged at a position overlapping the hole structure 40 when viewed from the direction perpendicular to the surface 421 of the filter 42.

The cover 48 has a cover body 62 facing the filter 42 and formed with the first vents 56 and the second vents 58, and a pressing part 64 projecting toward the support member 44 from the outer peripheral part of the cover body 62 and pressing the support member 44. The cover body 62 has a surface 621 facing the hole structure 40 and the filter 42. The surface 621 of the cover body 62 is positioned inside the recess 50. The overlapping portion 48K is provided in the cover body 62. The cover body 62 is spaced apart from the support member 44. The ventilation passage 54 is formed between the cover body 62 and the filter 42 and between the cover body 62 and the support member 44. The cover body 62 is accommodated in the recess 50 provided in the front wall portion 34f.

The cover 48 further includes a plurality of fixing portions 68 fixed to the side wall portion 34 outside the recess 50. The plurality of fixing portions 68 are arranged at intervals in the circumferential direction (horizontal direction) on the outer peripheral part of the cover 48 (see also FIG. 2). Each fixing portion 68 is fastened to the front wall portion 34f by a bolt 70. Thus, the cover 48 is fixed to the front wall portion 34f. Each fixing portion 68 protrudes from the cover body 62 (forward) in a direction opposite to the direction in which the pressing part 64 protrudes from the cover body 62. Each fixing portion 68 protrudes outward from the outer peripheral part of the cover 48.

Figure 5:
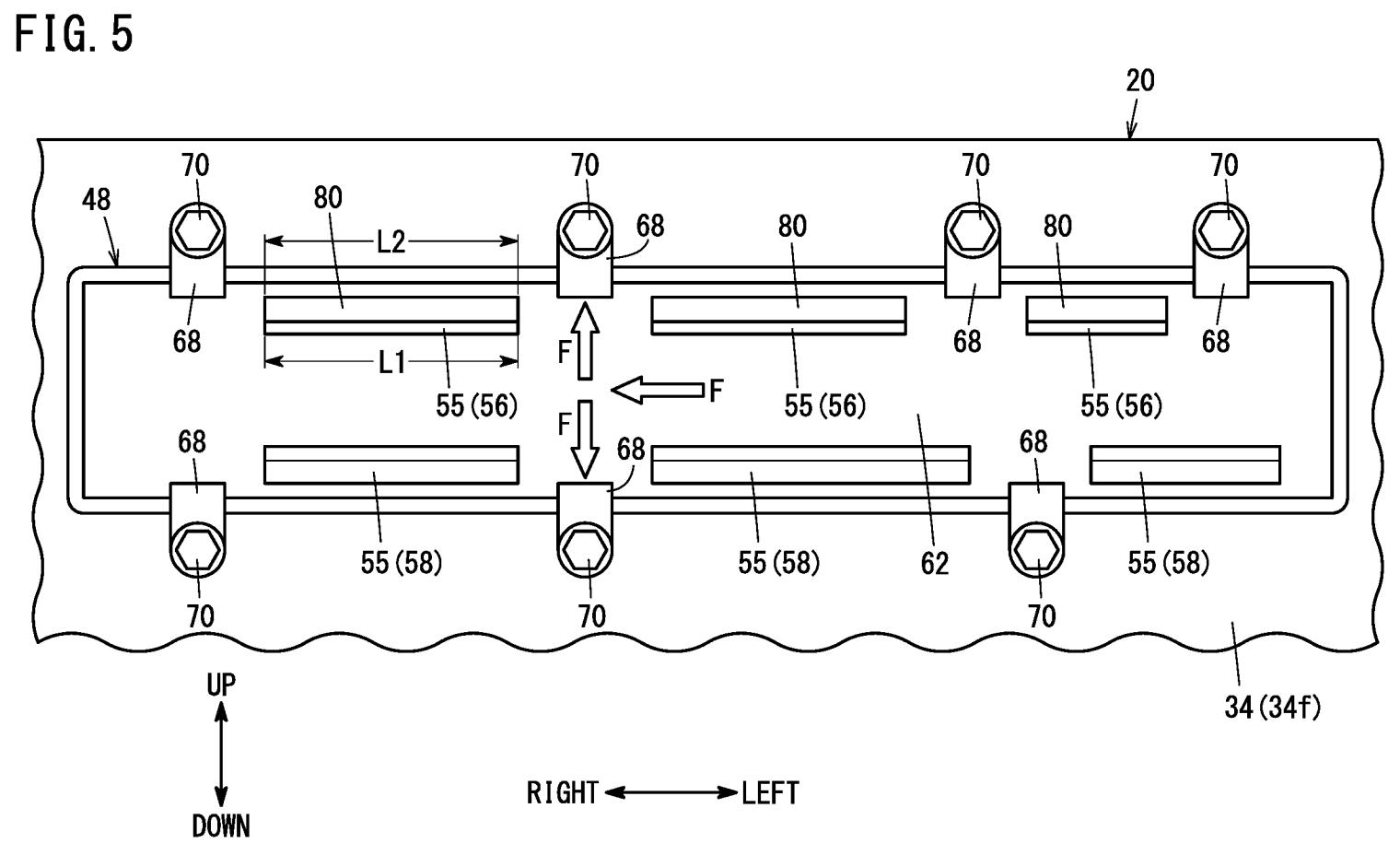

As shown in FIG. 5, in the horizontal direction, each of the first vents 56 and the second vents 58 is provided between the fixing portions 68 adjacent to each other in the horizontal direction among the plurality of fixing portions 68.

The cover 48 further includes a protrusion 80. On the cover 48, a plurality of (three in the present embodiment) protrusions 80 are provided correspondingly to the plurality of first vents 56. The protrusion 80 is adjacent to an upper end of the first vent 56. The protrusion 80 extends along the first vent 56. The horizontal length L2 of the protrusion 80 is greater than or equal to the horizontal length L1 of the first vent 56.

Figure 4:
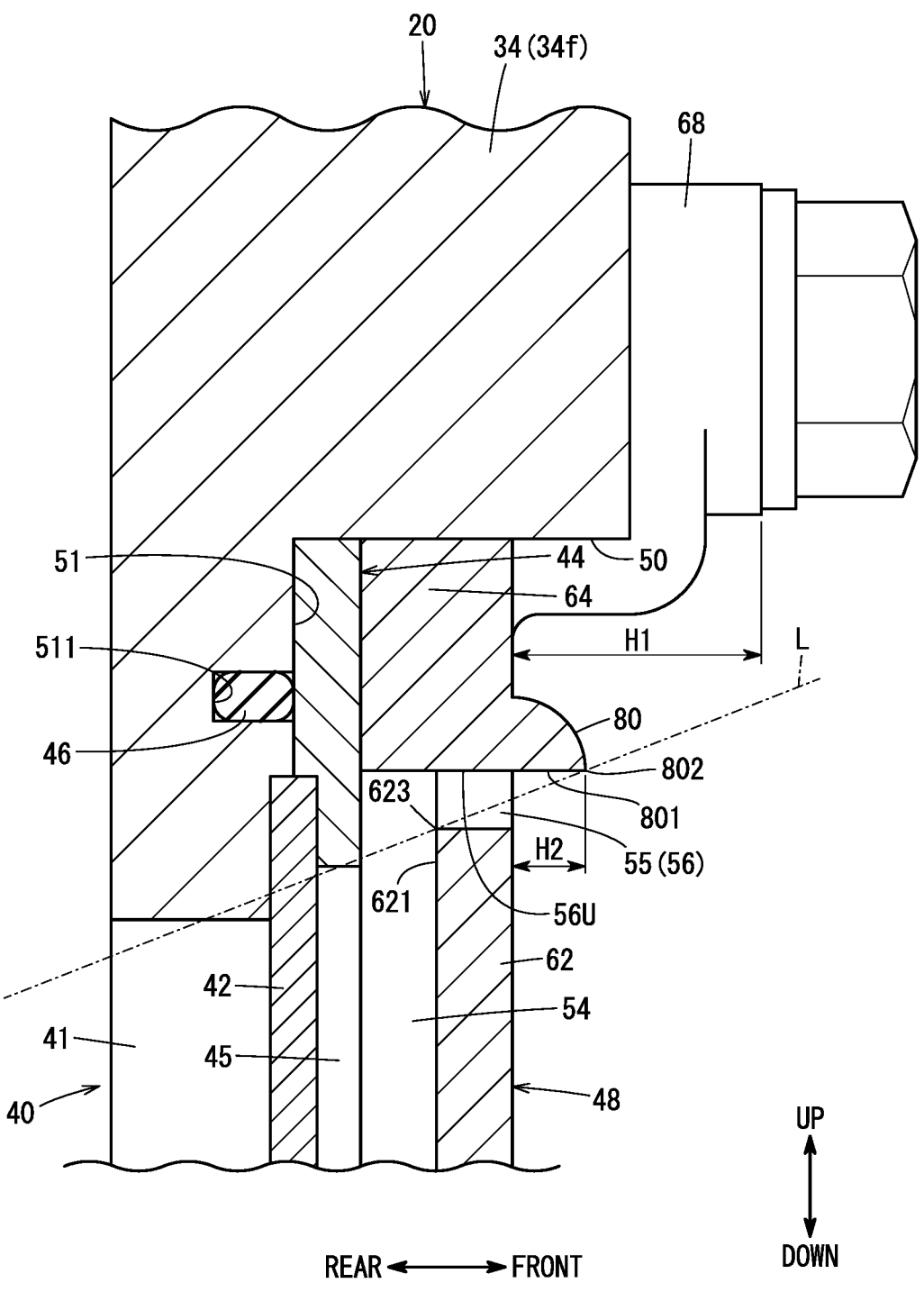
FIG. 4 is a partially enlarged cross-sectional view of the upper ventilation portion.

As shown in FIG. 4, the protrusion 80 adjacent to the upper end of the first vent 56 protrudes from the first vent 56 toward the outside (forward) of the stack case 20. A lower surface 801 of the protrusion 80 is positioned at the same level as the upper end surface 56U of the first vent 56. The lower surface 801 of the protrusion 80 extends horizontally. A protrusion length H2 of the protrusion 80 from the cover body 62 is smaller than the protrusion length H1 of the fixing portion 68 from the cover body 62.

The position of a protruding end 802 of the protrusion 80 is set such that the support member 44 is positioned on a straight line L passing through the protruding end 802 of the protrusion 80 and an end 623 of an upper surface 621 of the cover body 62. Therefore, when viewed from the outside of the cover 48, the upper portion of the filter 42 is visually blocked by the cover 48 having the protrusion 80 or the support member 44. That is, the filter 42 cannot be visually recognized from the outside of the cover 48 through the first vent 56.

As shown in FIG. 2, the lower ventilation portion 38L has a ventilation hole structure 40L penetrating through the front wall portion 34f which is one of the side wall portions 34, a filter 42L disposed on the outer surface of the front wall portion 34f so as to cover the hole structure 40L, and a support member 44L supporting the filter 42L. The lower ventilation portion 38L further includes a seal member 46L disposed between the front wall portion 34f and the support member 44, and a cover 48L covering the filter 42L.

The hole structure 40L has a plurality of openings 41L penetrating the front wall portion 34f in the front-rear direction. In the hole structure 40L, the plurality of openings 41L are arranged in the horizontal direction and also in the vertical direction. In the present embodiment, three openings 41L are arranged in the horizontal direction and two openings 41L are arranged in the vertical direction. The hole structure 40L has a total of 6 openings 41L.

In the hole structure 40L, a plurality of openings 41L are arranged so as to extend in the horizontal direction as a whole. The front wall portion 34f of the stack case 20 has a recess 50L extending in the horizontal direction. The recess 50L is a groove recessed rearward. The hole structure 40L is open at the bottom of the recess 50L. The number of the openings 41L is not limited to the above-described number and can be arbitrarily set.

The filter 42L, the support member 44L, the seal member 46L, and the cover 48L of the lower ventilation portion 38L basically have configurations formed by horizontally (transversely) shortening the filter 42, the support member 44, the seal member 46, and the cover 48 of the upper ventilation portion 38U, respectively. The filter 42L, the support member 44L, the seal member 46L, and the cover 48L have basically the same configurations as those of the filter 42, the support member 44, the seal member 46, and the cover 48 except for their lengths in the horizontal direction. Therefore, the filter 42L, the support member 44L, the seal member 46L, and the cover 48L are denoted by the same reference numerals and will not be described in detail. Accordingly, similar to the cover 48, the cover 48L also includes a first vent 56, a second vent 58, and a protrusion 80. Since the cover 48L is shorter than the cover 48, the lengths and the numbers of the first vents 56, the second vents 58, and the protrusions 80 of the cover 48L are different from the lengths and the numbers of the first vents 56, the second vents 58, and the protrusions 80 of the cover 48.

The fuel cell stack 12 operates as follows.

In FIG. 1, a fuel gas, an oxygen-containing gas, and a coolant are supplied to the fuel cell stack 12. The fuel gas is supplied to the anode of each power generation cell 19 through a fuel gas supply passage (not shown). The oxygen-containing gas is supplied to the cathode of each power generation cell 19 through an oxygen-containing gas supply passage (not shown). Hydrogen in the fuel gas supplied to the anode and oxygen in the oxygen-containing gas supplied to the cathode are consumed by the electrochemical reactions in the electrode catalyst layers to generate electric power.

In the stack case 20, a small amount of fuel gas may leak from the cell stack body 18. Therefore, the stack case 20 is provided with a ventilation structure 38. The ventilation structure 38 dilutes the fuel gas in the stack case 20 and reduces the concentration of the fuel gas by ventilating the stack case 20. Because the ventilation structure 38 includes the upper ventilation portion 38U and the lower ventilation portion 38L, the ventilation is carried out through the upper ventilation portion 38U and the lower ventilation portion 38L in particular. Although ventilation performed by the upper ventilation portion 38U will be representatively described below, ventilation is also performed by the lower ventilation portion 38L based on the same principle.

As shown in FIG. 3, the cover 48 of the ventilation structure 38 of the stack case 20 includes the first vents 56 that allow the ventilation passage 54 to communicate with the outside of the stack case 20, and the second vents 58 that allow the ventilation passage 54 to communicate with the outside of the stack case 20. Due to buoyancy of the fuel gas, the fuel gas is released from the space (ventilation passage 54) between the filter 42 and the cover 48 to the outside of the stack case 20 through the first vents 56. The release of the fuel gas from the first vents 56 draws the outside air into the space (ventilation passage 54) between the filter 42 and the cover 48 via the second vents 58.

As a result, natural ventilation due to buoyancy of the fuel gas is generated in the ventilation passage 54 inside the cover 48, and the concentration of the fuel gas in the space (ventilation passage 54) between the filter 42 and the cover 48 is diluted, so that a difference in concentration of the fuel gas is made between the inside and the outside of the filter 42. That is, the concentration of the fuel gas in the space (ventilation passage 54) between the filter 42 and the cover 48 becomes lower than the concentration of the fuel gas in the stack case 20, so that the fuel gas flows from the inside of the stack case 20 to the space (ventilation passage 54) between the filter 42 and the cover 48. Therefore, the diffusion and ventilation efficiency of the ventilation structure 38 can be improved.

The above-described ventilation is natural ventilation using buoyancy of the fuel gas in the ventilation passage 54, and is mainly performed while the fuel cell vehicle 10 (see FIG. 1) is stopped. On the other hand, during traveling of the fuel cell vehicle 10, forced ventilation using traveling wind is performed. The details of the forced ventilation will be described later.

Since the first vents 56 are provided at positions facing the upper portion of the ventilation passage 54 and the second vents 58 are provided at positions facing the lower portion of the ventilation passage 54, release of the fuel gas from the ventilation passage 54 and intake of air into the ventilation passage 54 can be efficiently performed.

No other vent is formed in the cover 48 between the first vent 56 and the second vent 58 in the vertical direction. The cover 48 has the overlapping portion 48K arranged at a position overlapping the hole structure 40 when viewed from the direction perpendicular to the surface 421 of the filter 42. Therefore, the filter 42 can be well protected.

The surface 621 of the cover 48 that faces the openings 41 is positioned inside the recess 50. Since the openings 41, the filter 42, and the surface (main surface) of the cover 48 are disposed inside the recess 50, even if an impact (external load) acts on the fuel cell vehicle 10 (see FIG. 1), peripheral components and the like are less likely to directly interfere with the ventilation structure 38.

As shown in FIG. 3, the ventilation structure 38 includes the support member 44 that supports the outer peripheral portion of the filter 42, and the cover 48 presses the support member 44 toward the side wall portion 34. Because the support member 44 holds the filter 42 and the cover 48 presses the support member 44 against the side wall portion 34, the filter 42 can be appropriately disposed with respect to the hole structure 40 which is the ventilation opening.

The cover 48 has a cover body 62 formed with the first vents 56 and the second vents 58, and a pressing part 64 projecting from the outer peripheral part of the cover body 62 toward the support member 44 and pressing the support member 44. Since the support member 44 is pressed by the pressing part 64, the support member 44 can be suitably fixed to the side wall portion 34. Because the pressing part 64 protrudes from the outer peripheral part of the cover body 62, an appropriate ventilation passage 54 can be ensured between the filter 42 and the cover body 62.

The fixing portion 68 of the cover 48 protrudes from the cover body 62 in the direction opposite to the direction in which the pressing part 64 protrudes from the cover body 62. The filter 42, the support member 44, and the cover body 62 which have lower strength than other structural components (low-strength structural components) are accommodated in the recess 50. Therefore, for example, when an external force F acts on the ventilation structure 38 from the front, the external force F can be prevented from directly acting on the low-strength structure components, and thus the low-strength structure components can be protected.

As shown in FIG. 5, the plurality of fixing portions 68 of the cover 48 are arranged along the horizontal direction with space therebetween. In the horizontal direction, each of the first vents 56 and the second vents 58 is provided between the fixing portions 68 adjacent to each other among the plurality of fixing portions 68. When the external force F acts on the cover 48, the external force F is transmitted to the fixing portions 68 (fastening portions) while the first vent 56 and the second vent 58 can avoid the transmission of the external force F. Therefore, it is possible to suppress breakage of the cover 48.

As shown in FIG. 3, the seal member 46 is disposed between the support member 44 and the side wall portion 34. When the cover 48 presses the support member 44, the seal member 46 is compressed in the thickness direction of the side wall portion 34 between the support member 44 and the side wall portion 34. With this configuration, it is possible to prevent water from entering the hole structure 40 from the outside of the stack case 20. Because the cover 48 not only protects the filter 42 but also has a function of compressing the seal member 46, the structure rationalization is achieved.

The cover 48 has the protrusion 80 formed in a convex shape outward with respect to the main surface of the cover 48 around the vent 55. The protrusion 80 protrudes toward the outside of the stack case 20. Because the protrusion 80 is provided around the vent 55 (in the present embodiment, adjacent to the upper end of the first vent 56), it is possible to suppress the influence of external factors such as the high-pressure cleaning water W (for example, water intrusion). Therefore, it is possible to protect the filter 42 from the influence of external factors while securing a ventilation path necessary for ventilation.

As shown in FIG. 4, because the lower surface 801 of the protrusion 80 is positioned at the same level as the upper end surface 56U of the first vent 56, the influence of external factors such as the high-pressure cleaning water W can be more effectively suppressed.

The position of the protruding end 802 of the protrusion 80 is set such that the support member 44 is positioned on the straight line L passing through the protruding end 802 of the protrusion 80 and the end (upper end 623) of the upper surface 621 of the cover body 62. With this configuration, even when cleaning water enters the inside (ventilation passage 54) of the cover 48 via the first vent 56 during high-pressure cleaning, the cleaning water is prevented from directly hitting the filter 42, so that breakage of the filter 42 can be prevented.

As shown in FIG. 5, the first vent 56 is formed in a slit shape extending in the horizontal direction, and the protrusion 80 extends along the first vent 56. Because the first vent 56 is formed in a slit shape, the filter 42 can be suitably protected by the cover 48 from foreign matter or the like coming from the outside of the stack case 20.

Since the horizontal length L2 of the protrusion 80 is greater than or equal to the horizontal length L1 of the first vent 56, the influence of external factors such as the high-pressure cleaning water W can be more effectively suppressed.

As shown in FIG. 3, the ventilation structure 38 includes the labyrinth flow path 60 formed by the second vent 58 and the lower portion of the ventilation passage 54. The influence of external factors such as the high-pressure cleaning water W can also be suppressed by the labyrinth flow path 60.

As indicated by an imaginary line in FIG. 3, the protrusion 80L may be provided adjacent to the second vent 58. In this case, the protrusion 80L adjacent to the upper end of the second vent 58 protrudes from the second vent 58 toward the outside (forward) of the stack case 20.

The filter 42 has exposed surfaces 42S (exposed portions) which are exposed from the support member 44 which is an intermediate member, and directly face the cover 48. In the direction perpendicular to the surface 421 of the filter 42, the support member 44 is positioned on the extension lines of the first vents 56 and the second vents 58, and the exposed surfaces 42S of the filter 42 are out of alignment with the extension line. With this configuration, even when foreign matter coming from the direction perpendicular to the surface 421 of the filter 42 enters the ventilation passage 54 through the first vents 56 or the second vents 58, the foreign matter can be prevented from directly hitting the exposed surfaces 42S of the filter 42.

During traveling of the fuel cell vehicle 10 shown in FIG. 1, forced ventilation using traveling wind is performed as follows.

During traveling of the fuel cell vehicle 10, atmospheric air as traveling wind enters the front room 14 from the front grille 16 and the like. Because the traveling wind flowing into the front room 14 is blocked by auxiliary devices (not shown) disposed in front of the stack case 20 in the front room 14, the traveling wind is unlikely to reach the upper portion of the stack case 20. On the other hand, in the lower portion in the front room 14, a part of the traveling wind reaches the lower portion of the stack case 20 without being blocked by the auxiliary devices such as the radiator and the fan.

Figure 6:
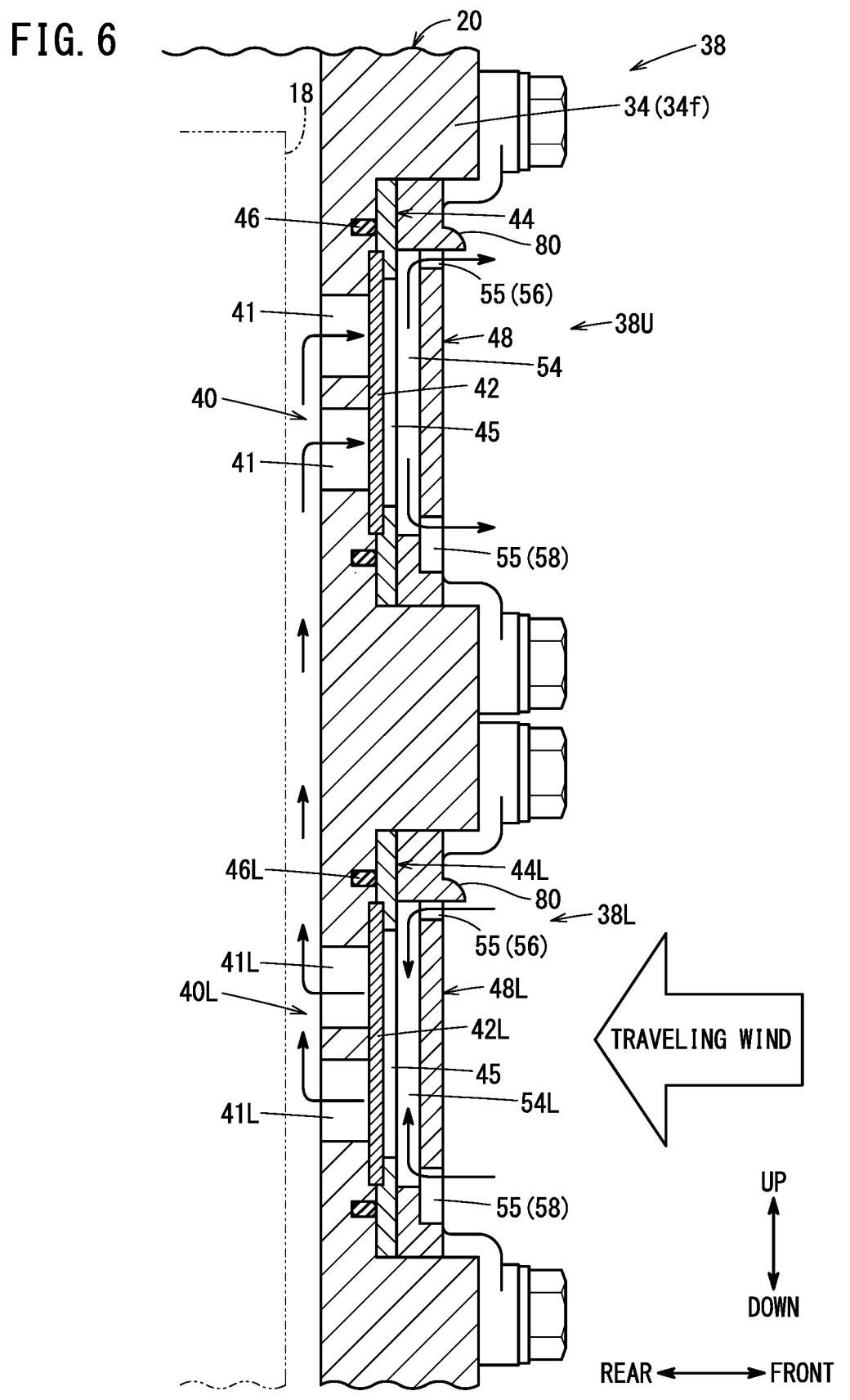

As shown in FIG. 6, the traveling wind that has reached the lower portion of the stack case 20 flows into the stack case via the lower ventilation portion 38L. To be specific, the traveling wind flows into the stack case 20 via the first vents 56 and the second vents 58 of the cover 48L, the ventilation passage 54L, the filter 42L, and the hole structure 40L (the plurality of openings 41L).

As described above, during traveling of the fuel cell vehicle 10, the lower ventilation portion 38L functions as an air inflow portion that takes air (outside air) into the stack case 20. In the lower ventilation portion 38L, flow paths from the first vents 56 and the second vents 58 to the filter 42L are bent. For this reason, even when foreign matter such as sand grains or dust is entrained by the traveling wind, the foreign matter is unlikely to reach the filter 42. Even when the foreign matter reaches the filter 42L, the foreign matter is captured by the filter 42L.

The air flowing into the stack case 20 through the lower ventilation portion 38L rises between the outer surface of the cell stack body 18 and the inner surface of the stack case 20. When a small amount of fuel gas leaks from the fuel cell stack 12 into the stack case 20, the fuel gas also rises inside the stack case 20. When a small amount of fuel gas leaks into the stack case 20, the fuel gas is entrained by the air introduced into the stack case 20 by the traveling wind and is released to the outside of the stack case 20 via the upper ventilation portion 38U.

Specifically, the air flows out from the inside of the stack case 20 to the outside of the stack case 20 through the hole structure 40 (the plurality of openings 41), the filter 42, the ventilation passage 54, and the first vent 56 and the second vent 58 of the cover 48 of the upper ventilation portion 38U. When the fuel gas leaks, the fuel gas diluted with air is released to the front room 14. In this way, during traveling of the fuel cell vehicle 10, the upper ventilation portion 38U functions as a discharge portion that discharges air to the outside of the stack case 20.

The case in which the ventilation structure 38 is provided may be the auxiliary device case 22. The ventilation structure 38 may be provided in each of the stack case 20 and the auxiliary device case 22. The ventilation structure 38 may include only one of the upper ventilation portion 38U and the lower ventilation portion 38L. The ventilation structure 38 may include a ventilation portion having the same structure as that of the upper ventilation portion 38U or the lower ventilation portion 38L and positioned between the upper portion and the lower portion, in the vertical direction, of at least one of the stack case 20 and the auxiliary device case 22.

The above embodiments can be summarized as follows.

The embodiment described above discloses the fuel cell stack (12) including: the cell stack body (18) including the plurality of power generation cells (19); and the casing housing at least one of the cell stack body and the fuel cell auxiliary device, wherein the casing includes the side provided with the opening (41, 41L), the filter (42, 42L) attached to the opening and permeable to the fuel gas, and the cover (48, 48L) attached outside the filter, and the cover includes the first vent (56) configured to connect the inside and the outside of the cover and the second vent (58) provided at the position lower than the first vent and configured to connect the inside and the outside of the cover.

The casing includes the upper wall portion (30), the lower wall portion (32), and the side wall portion (34) connecting the upper wall portion and the lower wall portion, and the side provided with the opening is the side wall portion.

The ventilation passage (54, 54L) is formed between the filter and the cover, the first vent is provided at the position facing the upper portion of the ventilation passage, and the second vent is provided at the position facing the lower portion of the ventilation passage.

The first vent is provided at the position higher than the upper end of the opening, and the second vent is provided at the position lower than the lower end of the opening.

The cover is free from a vent between the first vent and the second vent of the cover in the vertical direction, and the cover includes the overlapping portion (48K) arranged at the position overlapping the opening when viewed from the direction perpendicular to the surface (421) of the filter.

The recess (50, 50L) dented toward an inside of the casing is formed on the side, and the opening is formed at a bottom (51) of the recess.

The surface (621) of the cover that faces the opening is positioned inside the recess.

The casing includes the support member (44, 44L) supporting the outer peripheral portion of the filter and having the opening for ventilation, and the cover presses the support member toward the side.

The cover includes the cover body (62) facing the filter and formed with the first vent and the second vent, the pressing part (64) projecting from the outer peripheral part of the cover body (62) toward the support member and pressing the support member, and the cover body is positioned apart from the support member.

The filter, the support member, and the cover body are housed in the recess (50) provided in the side wall portion, the cover includes the fixing portion (68) fixed to the side wall portion outside the recess, and the fixing portion protrudes from the cover body in the direction opposite to the direction in which the pressing part protrudes from the cover body.

The cover includes the plurality of fixing portions including the fixing portion, the plurality of fixing portions are arranged along the horizontal direction with a space therebetween, and along the horizontal direction, the first vent and the second vent are provided between fixing portions adjacent to each other among the plurality of fixing portions.

The seal member (46, 46L) is arranged between the support member and the side so as to surround the opening, and the seal member is compressed in the thickness-wise direction of the side between the support member and the side by the cover pressing the support member.

The side having the opening is a front wall portion (34f) of the casing.

The above-described embodiment discloses the fuel gas release method for the fuel cell stack (12) including: the cell stack body (18) including the plurality of power generation cells (19); and the casing housing at least one of the cell stack body and the fuel cell auxiliary device, wherein the casing includes a side provided with the opening (41, 41L), the filter (42, 42L) attached to the opening and permeable to the fuel gas, and the cover (48, 48L) provided outside the filter, and the cover includes the first vent (56) configured to connect the inside and an outside of the cover and the second vent (58) provided at the position lower than the first vent and configured to connect the inner side and the outer side of the cover, the method comprising: releasing the fuel gas from the inside to the outside of the cover through the first vent; and taking in air from the outside to the inside of the cover through the second vent.

The present invention is not limited to the above-described embodiments, and various configurations can be adopted therein without departing from the essence and gist of the present invention.

The invention claimed is:

1. A fuel cell stack comprising:
a cell stack body including a plurality of power generation cells; and
a casing housing at least one of the cell stack body or a fuel cell auxiliary device, wherein the casing comprises:
a side including an opening;
a filter attached to the opening and permeable to a fuel gas; and
a cover provided outside the filter, and
the cover comprises:
a first vent configured to connect an inside and an outside of the cover; and
a second vent provided at a position lower than the first vent and configured to connect the inside and the outside of the cover
the casing includes a support member supporting an outer peripheral portion of the filter and having an opening for ventilation, and
the cover presses the support member toward the side.

2. The fuel cell stack according to claim 1, wherein the cover further comprises: a cover body facing the filter and formed with the first vent and the second vent;
a pressing part projecting from an outer peripheral part of the cover body toward the support member and pressing the support member; and
the cover body is positioned apart from the support member.

3. The fuel cell stack according to claim 2, wherein the filter, the support member, and the cover body are accommodated in a recess formed on the side, and
the cover includes a fixing portion fixed to the side wall portion outside the recess, and
the fixing portion of the cover protrudes from the cover body in a direction opposite to a direction in which the pressing part protrudes from the cover body.

4. The fuel cell stack according to claim 3, wherein the cover is provided with a plurality of fixing portions including the fixing portion, and
the plurality of fixing portions of the cover are arranged along a horizontal direction with a space between each of the plurality of fixing portions, and
along the horizontal direction, the first vent and the second vent are provided between the fixing portions adjacent to each other among the plurality of fixing portions.

5. The fuel cell stack according to claim 1, wherein a seal member is disposed between the support member and the side so as to surround the opening, and
the seal member is compressed in the thickness-wise direction of the side between the support member and the side by the cover pressing the support member.

6. The fuel cell stack according to claim 1, wherein the side provided with the opening is a front wall portion of the casing.

7. A fuel gas release method for a fuel cell stack comprising a cell stack body including a plurality of power generation cells, and a casing housing at least one of the cell stack body or a fuel cell auxiliary device, wherein the casing comprises:

a side including an opening;

a filter attached to the opening and permeable to a fuel gas; and a cover attached outside the filter, the cover comprises:

a first vent configured to connect an inside and an outside of the cover; and a second vent provided at a position lower than the first vent and configured to connect the inside and the outside of the cover, the method comprising:

releasing the fuel gas from the inside to the outside of the cover through the first vent; and taking in air from the outside to the inside of the cover through the second vent.

* * * * *